United States Patent
Van Seijen et al.

(10) Patent No.: US 12,278,841 B2
(45) Date of Patent: *Apr. 15, 2025

(54) SECURE EXPLORATION FOR REINFORCEMENT LEARNING

(71) Applicant: MICROSOFT TECHNOLOGY LICENSING, LLC, Redmond, WA (US)

(72) Inventors: Harm Hendrik Van Seijen, Montreal (CA); Seyed Mehdi Fatemi Booshehri, Montreal (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,155

(22) Filed: Feb. 17, 2023

(65) Prior Publication Data

US 2023/0199031 A1     Jun. 22, 2023

Related U.S. Application Data

(63) Continuation of application No. 16/554,525, filed on Aug. 28, 2019, now Pat. No. 11,616,813.

(Continued)

(51) Int. Cl.
*H04L 9/40*     (2022.01)
*G06N 5/043*     (2023.01)
*G06N 20/00*     (2019.01)

(52) U.S. Cl.
CPC .............. *H04L 63/20* (2013.01); *G06N 5/043* (2013.01); *G06N 20/00* (2019.01)

(58) Field of Classification Search
CPC .......... H04L 63/20; G06N 20/00; G06N 5/043
See application file for complete search history.

(56) References Cited

U.S. PATENT DOCUMENTS 11,429,892 B2 *   8/2022   Chaturapruek ........ G06N 20/00
2010/0318478 A1 *   12/2010   Yoshiike ................ G06V 20/10
                                                                  706/12

(Continued)

OTHER PUBLICATIONS

"Office Action Issued in European Patent Application No. 19768960.7", Mailed Date: Aug. 4, 2023, 13 Pages.

(Continued)

*Primary Examiner* — Ghodrat Jamshidi
(74) *Attorney, Agent, or Firm* — Shook, Hardy & Bacon L.L.P.

(57) ABSTRACT

A secured exploration agent for reinforcement learning (RL) is provided. Securitizing an exploration agent includes training the exploration agent to avoid dead-end states and dead-end trajectories. During training, the exploration agent "learns" to identify and avoid dead-end states of a Markov Decision Process (MDP). The secured exploration agent is utilized to safely and efficiently explore the environment, while significantly reducing the training time, as well as the cost and safety concerns associated with conventional RL. The secured exploration agent is employed to guide the behavior of a corresponding exploitation agent. During training, a policy of the exploration agent is iteratively updated to reflect an estimated probability that a state is a dead-end state. The probability, via the exploration policy, that the exploration agent chooses an action that results in a transition to a dead-end state is reduced to reflect the estimated probability that the state is a dead-end state.

20 Claims, 11 Drawing Sheets

Related U.S. Application Data

(60) Provisional application No. 62/725,981, filed on Aug. 31, 2018.

(56) References Cited

U.S. PATENT DOCUMENTS

| | | | | |
|---|---|---|---|---|
| 2015/0227710 | A1* | 8/2015 | Pappada | G16H 70/20 705/2 |
| 2017/0317974 | A1* | 11/2017 | Masurekar | H04L 67/561 |
| 2018/0068657 | A1* | 3/2018 | Khan | G10L 15/063 |
| 2018/0165745 | A1* | 6/2018 | Zhu | G06Q 30/0631 |
| 2019/0250568 | A1* | 8/2019 | Li | G06N 7/01 |
| 2019/0324795 | A1* | 10/2019 | Gao | G06F 9/4843 |
| 2019/0339087 | A1* | 11/2019 | Jindal | G06F 17/17 |
| 2019/0370219 | A1* | 12/2019 | Efstathiou | G06N 20/20 |
| 2020/0005645 | A1* | 1/2020 | Wray | G08G 1/166 |

OTHER PUBLICATIONS

Decision to refuse a European patent application Art. 97(2) Received for European Application No. 19768960.7, mailed on Jun. 5, 2024, 4 pages.

Summons to attend oral proceedings Received for European Patent Application No. 19768960.7, mailed on Feb. 16, 2024, 10 pages.

* cited by examiner

420

Algorithm 1: Q-learning with secure random-walk.

parameter: $\alpha_e$ and $\alpha_\pi$ = step sizes
set $q_e(s,a) = q_\pi(s,a) = 0, \ \forall (s,a) \in \mathcal{S} \times \mathcal{A}$ — 422
set $s \leftarrow$ initial state
repeat
    if $q_e(s,a) = -1$ *for all* $a \in \mathcal{A}$ then — 424
        select $a \sim \mathcal{U}(\mathcal{A})$
    else
        compute $\eta(s,\cdot)$ from Equation 1 — 426
        select $a \sim \eta(s,\cdot)$
    observe $(r, s')$ — 428
    if *undesired termination* then
        $q'_e = 0$ — 430
        $r_e = -1$
    else
        $q'_e = \max_{a'} q_e(s', a')$ — 432
        $r_e = 0$
    $q_e(s,a) \leftarrow (1-\alpha_e)q_e(s,a) + \alpha_e(r_e + q'_e)$ — 434
    $q_\pi(s,a) \leftarrow (1-\alpha_\pi)q_\pi(s,a) + \alpha_\pi(r_\pi + \gamma_\pi \max_{a' \in \mathcal{A}} q_\pi(s',a'))$ — 436
    $s \leftarrow s'$ — 438
until $q_\pi$ *converges*; — 440

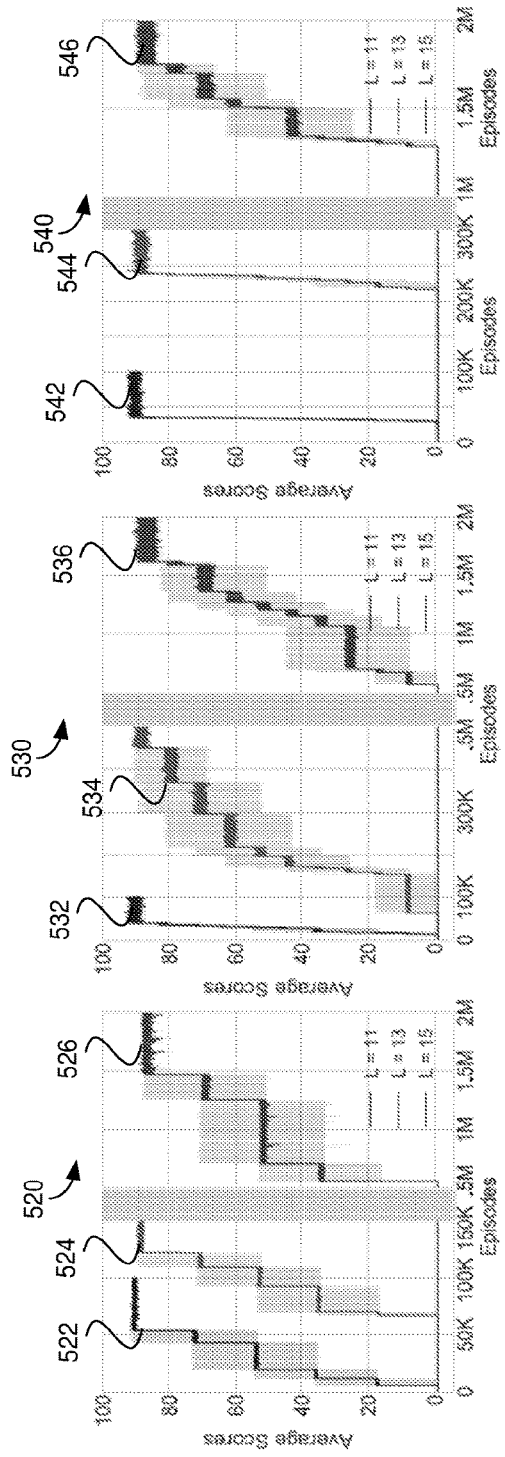
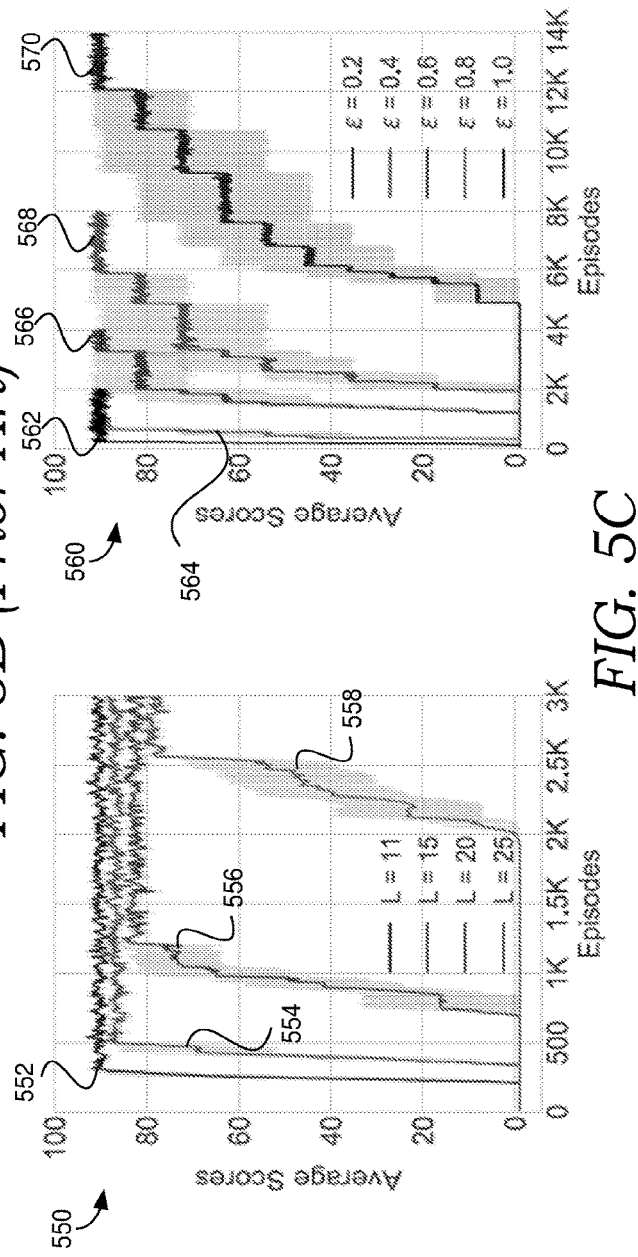
FIG. 5B (Prior Art)
FIG. 5C

Theorem (1). *If the followings hold:*

1. *States and actions are finite (tabular settings).*
2. *Policy $\eta$ exists, which satisfies* Property 1, *and is used as the sole behavioural policy.*
3. *$\eta$ visits all the non-dead-end states infinitely often.*
4. *$q_\pi(\cdot, \cdot)$ is initialized at zero.*
5. *Standard conditions on the step-size $\alpha_\pi$.*

*then, Q-learning of $q_\pi$ converges to $q_\pi^*$.*

*Proof.* We should prove that never seeing $(s, a_d, s')$, $s \in \mathcal{S} \setminus \mathcal{S}_D$ and $s' \in \mathcal{S}_D$, does not affect convergence of $q_\pi$. We also need to prove that not visiting dead-end states infinitely often (that implies by assumption 2) does not affect the convergence of $q_\pi$ either.

By definition, $R(s, a, s') \leq 0$ for all dead-end states $s'$. Additionally, because the undesired terminal states are zero-valued and all the transitions inside a dead-end trajectory are non-positively rewarded, it follows that the value of a dead-end state is always non-positive (but its magnitude depends on the dead-end's length and $\gamma$). Consider the Q-learning update for a general transition from state $i$ to $j$ with action $a$ and reward $r$, namely $$q(i, a) \leftarrow (1 - \alpha) q(i, a) + \alpha \delta, \text{ with}$$
$$\delta = r + \gamma \max_{a' \in \mathcal{A}} q(j, a').$$

Let $\mathcal{A}_D(s)$ denote the set of all actions $a_d$, where $T(s, a_d, s') = 1$, $s' \in \mathcal{S}_D$. Property 1 with $\lambda = 0$ brings $T(s, a, s') = 1 \implies \eta(s, a) = 0$, which implies that at state $s$, $\eta$ never selects $a_d \in \mathcal{A}_D(s)$. Therefore, $q(s, a_d)$ remains zero for all $s$ and we have $q(s, a_d) = 0 \leq \max_{a' \in \mathcal{A}} q(s, a'), \forall a_d \in \mathcal{A}_D(s)$, which implies $\max_{a' \in \mathcal{A}} q(s, a') = \max_{a' \in \mathcal{A} \setminus \mathcal{A}_D(s)} q(s, a')$. Hence, the Q-learning target $\delta$ remains unchanged if $\mathcal{A}_D(s)$ is excluded from behavioural policy. Additionally, Property 1 still maintains the probability of selecting other actions to be non-zero, which together with assumption 3 fulfills the general conditions under which Q-learning converges, and therefore Q-learning still converges to the same $q^*$ as if $\mathcal{A}_D$ has not been excluded, namely $q_\pi^*$. □

*FIG. 6A*

Theorem (2). *Let $q_e^*$ be the optimal value function of $\mathcal{M}_e$ under P1 and P2. Let further $\mu$ be any arbitrary policy that satisfies the following:*

$$\mu(s,a) \leq 1 + q_e^*(s,a), \quad \forall (s,a) \in \mathcal{S} \times \mathcal{A} \tag{7}$$

*then $\mu$ is secure.*

*Proof.* The two conditions jointly imply that the value of all the states on all dead-end trajectories will be exactly $-1$ regardless of their length. Specifically, under P1 and P2, direct evaluation of Bellman's equation follows that for all dead-end states $s' \in \mathcal{S}_D$, all non-dead-end states $s \in \mathcal{S} \setminus \mathcal{S}_D$ and all actions $a \in \mathcal{A}$, $q_e^*(s',a) = -1$, which directly implies $\max_{a'} q_e^*(s',a) = -1$. For non-dead-end states $s \in \mathcal{S} \setminus \mathcal{S}_D$ we therefore get:

$$\begin{aligned} q_e^*(s,a) &= -\sum_{s' \in \mathcal{S}_D} T(s,a,s') + \sum_{s' \notin \mathcal{S}_D} T(s,a,s') \max_{a'} q_e^*(s',a') \\ &= -\sum_{s' \in \mathcal{S}_D} T(s,a,s') - \beta(s,a), \quad \beta(s,a) \in [0,1), \end{aligned} \tag{8}$$

where the bounds on $\beta$ come from the fact that $q_e^*(\cdot,\cdot) \in [-1,0]$. Also because $s$ is not a dead-end, $\sum_{s' \in \mathcal{S}_D} T(s,a,s') < 1$; hence the stated bound in (8). Using the antecedent of Property 1, it therefore yields:

$$\begin{aligned} q_e^*(s,a) &\leq q_e^*(s,a) + \beta(s,a) \\ &= -\sum_{s' \in \mathcal{S}_D} T(s,a,s') \\ &\leq -(1-\lambda) \\ \implies 1 + q_e^*(s,a) &\leq \lambda. \end{aligned} \tag{9}$$

Hence, setting the following:

$$\mu(s,a) \leq 1 + q_e^*(s,a) \tag{10}$$

will hold the consequent, thereby assures Property 1, and $\mu$ is secure by definition. □

Theorem (3). *Under P1 and P2, let $v_e^*$ and $q_e^*$ be the optimal state and state-action value functions of $\mathcal{M}_e$, respectively. Then, unless $T(s,a,s') = 1$, there exists a gap between $v_e^*(s')$ and $q_e^*(s,a)$ for all $a \in \mathcal{A}$, all dead-end states $s'$ and all non-dead-end states $s$. Furthermore, the gap is independent of dead-end's possible length.*

*Proof.* Similarly to Theorem 2, the two conditions jointly imply that the value of all the states on all dead-end trajectories will be exactly $-1$ regardless of their length. In particular, $v_e^*(s') = \max_{a'} q_e^*(s',a') = -1$, $\forall s' \in \mathcal{S}_D$, which implies $q_e^*(s,a) = -1$ if $T(s,a,s') = 1$. On the other hand, for all non-dead-end states $s$, $\max_{a'} q(s,a') = 0$ because there always exists at least one action that transitions to a non-dead-end state (due to the assumption of $s$ being non-dead-end itself). It then implies $q_e^*(s,a) = -\sum_{s'} T(s,a,s') > -1$ if $T(s,a,s') < 1$, $\forall s' \in \mathcal{S}_D$. As a result, there will be a theoretical gap between $q_e^*(s,a) \neq -1$ and $v_e^*(s') = -1$, which only depends on the transition probabilities $T(s,a,s')$ and not the length of dead-ends. □

FIG. 6B

Theorem (3). *Under P1 and P2, let $v_e^*$ and $q_e^*$ be the optimal state and state-action value functions of $\mathcal{M}_e$, respectively. Then, unless $T(s, a, s') = 1$, there exists a gap between $v_e^*(s')$ and $q_e^*(s, a)$ for all $a \in \mathcal{A}$, all dead-end states $s'$ and all non-dead-end states $s$. Furthermore, the gap is independent of dead-end's possible length.*

*Proof.* Similarly to Theorem 2, the two conditions jointly imply that the value of all the states on all dead-end trajectories will be exactly $-1$ regardless of their length. In particular, $v_e^*(s') = \max_{a'} q_e^*(s', a') = -1, \forall s' \in \mathcal{S}_D$, which implies $q_e^*(s, a) = -1$ if $T(s, a, s') = 1$. On the other hand, for all non-dead-end states $s$, $\max_{a'} q(s, a') = 0$ because there always exists at least one action that transitions to a non-dead-end state (due to the assumption of $s$ being non-dead-end itself). It then implies $q_e^*(s, a) = -\sum_{s'} T(s, a, s') > -1$ if $T(s, a, s') < 1$, $\forall s' \in \mathcal{S}_D$. As a result, there will be a theoretical gap between $q_e^*(s, a) \neq -1$ and $v_e^*(s') = -1$, which only depends on the transition probabilities $T(s, a, s')$ and not the length of dead-ends. □

*FIG. 6C*

SECURE EXPLORATION FOR REINFORCEMENT LEARNING

CROSS-REFERENCE TO RELATED APPLICATIONS

This application is a continuation of U.S. Non-Provisional patent application Ser. No. 16/554,525 filed on Aug. 28, 2019, and entitled "SECURE EXPLORATION FOR REINFORCEMENT LEARNING, which application claims priority to U.S. Provisional Patent Application 62/725,981 filed on Aug. 31, 2018, and entitled "SECURE EXPLORATION FOR REINFORCEMENT LEARNING," and," the contents of which are incorporated herein in their entireties.

BACKGROUND

Conventional reinforcement learning (RL) may be applied to train an agent to achieve a task or goal (e.g., a task or goal within the context of a game), when the environment and the agent's possible actions can be modeled as a Markov Decision Process (MDP). However, in many interesting applications, conventional RL may be an unrealistic framework to train an agent to achieve the task or goal. In these interesting applications, conventional RL may result in unacceptably slow convergence in the training, as well as safety concerns and costs associated with a "clumsy" agent "stumbling" through the environment and damaging hardware assets during training. For instance, during the early stages of conventional RL training, an agent's knowledge of the MDP's state transition probability function and corresponding rewards (or dangers) is limited. Thus, during the early stages of conventional RL training, the agent may spend a significant amount of time "exploring" their environment in a clumsy and/or ill-informed manner.

Furthermore, many real-world applications of RL exacerbates these concerns and/or limitations. Training an agent in these applications via conventional RL methods may result in the agent spending a significant amount of time in "dead-end" states and trajectories of unknown and/or random length. Spending training time in dead-end trajectories generates little to no relevant knowledge for the agent to "learn." Also, any time spent in dead-end trajectories may expose hardware assets to potentially damaging states, endanger the safety of individuals and/or the environment, and exhaust limited resources, such as time and/or financial resources.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The various embodiments herein provide an exploration agent that is secured. As discussed throughout, securitizing an exploration agent includes training the exploration agent to avoid dead-end states and dead-end trajectories. That is, during training, the exploration agent "learns" to identify and avoid dead-end states of an environment that models an application, via a secured exploration of the environment. The model may include a decision process, such as but not limited to a Markov Decision Process (MDP). The decision process may include a decision process model, such as but not limited to a MDP model. That is, in the various embodiments, the agent may employ a decision process to securely explore their environment. Accordingly, the secured exploration agent may be utilized to safely and efficiently explore the environment, while significantly reducing the training time, as well as the cost and safety concerns associated with conventional RL. The secured exploration agent may be employed to guide the behavior of a corresponding exploitation agent. In some embodiments and during training, the policy of the exploration agent is iteratively updated to reflect an estimated probability (or likelihood) that a state is a dead-end state. The probability (or likelihood) that the exploration agent chooses an action (via a secured exploration policy) that results in a transition to a dead-end state is reduced to reflect the estimated likelihood that the state is a dead-end state. Thus, the exploration agent learns to avoid dead-end states, significantly reducing the training time, as well as the cost and safety concerns associated with conventional RL training methods.

Various embodiments may include employing a secured policy (e.g., a secure exploration policy) to perform a task. A decision process may model the performance of the task. In some bob-limiting embodiments, the decision process may be a Markov Decision Process (MPD). The secured policy (of the decision process) may have been securely trained via the various embodiments discussed within. One embodiment includes determining a current state of an agent within an environment of the decision process. A plurality of available actions may be determined based on the decision process. Each of the plurality of actions is available for execution at the agent's current state. The secured policy may be employed to select or identify a first action of the plurality of actions. The secured policy may provide a score for each of the plurality of actions that is based on a probability that performing the action at the agent's current state will transition the agent's current state to a dead-end state of the agent. The agent may execute the first action for, or in service of, the performance of the task.

In some embodiments, the performance of the task may include achieving an objective within a virtualized environment (e.g., a video game). In such embodiments, executing the first action may transition the agent's current state to a winning state of the game. The winning state may include the agent achieving the objective within the virtualized environment. In other embodiments, the performance of the task includes providing a therapeutic treatment in a physical environment. In such embodiments, executing the first action may include providing a user (e.g., a patient) one or more pharmaceuticals or other therapeutic treatments.

The secured policy may be securely learned. That is, in some embodiments, the secured policy may be determined through a RL method that employs a security cap to reduce an amount of resources employed to explore a plurality of dead-end states of the agent. The security cap may based on an exploration decision process that has an exploration rewards function that is separate from a reward function of the decision process. The exploration decision process may further include an exploration discount factor that is separate from a discount factor of the decision process.

When learning the secured policy, the agent may be employed to iteratively explore the environment of the decision process. An exploration action-value function may be iteratively determined based on iteratively exploring the environment of the decision process. The exploration action-value function may be initialized to 0.0 for all possible state-action pairs of the decision process. A security cap may be iteratively updated based on the iteratively determined exploration action-value function and one or more probabilities that a particular state of the agent is the dead-end state. The secured policy may be iteratively updated based on the iteratively updated security cap. The updated secured policy may not exceed the security cap and is reduced by an amount that is based on the one or more probabilities that the particular state of the agent is the dead-end state. Each of a plurality of possible trajectories from the dead end-state may terminate at an undesired terminal state of the agent. That is, the possible trajectories may be dead-end trajectories.

Each undesired terminal state of a plurality of undesired terminal states of the agent may be associated with an exploration reward value of −1.0. Each dead-end state of a plurality of dead-end states of the agent may be associated with an exploration reward value that is between −1.0 and 0.0. The secured policy may be iteratively updated based on an off-policy mechanism. The agent may be an exploitation agent that is iteratively updated based on the iteratively updated secure policy. The probability that performing each of the other actions of the plurality of actions at the agent's current state will transition the agent's current state to the dead-end state may be greater than the probability that performing first action at the agent's current state will transition the agent's current state to the dead-end state. The decision process may include bridge effects.

BRIEF DESCRIPTION OF THE DRAWINGS

Aspects of the disclosure are described in detail below with reference to the attached drawing figures, wherein:

FIG. 4B provides pseudo-code for implementing at least portions of the method of FIG. 4A;

FIG. 5B shows the convergence of training an agent to play the bridge game of FIG. 5A, where the agent is trained via conventional reinforcement learning methods;

FIG. 5C shows the convergence of training an agent to play the bridge game of FIG. 5A, where the agent is trained via the enhanced secure exploration reinforcement learning methods discussed herein;

FIG. 6A provides a formal proof to a result relied upon for securing the training of an exploration agent;

FIG. 6B provides a formal proof to another result relied upon for securing the training of an exploration agent;

FIG. 6C provides a formal proof to an auxiliary result that may be relied upon for securing the training of an exploration agent.

DETAILED DESCRIPTION

Figure 1:
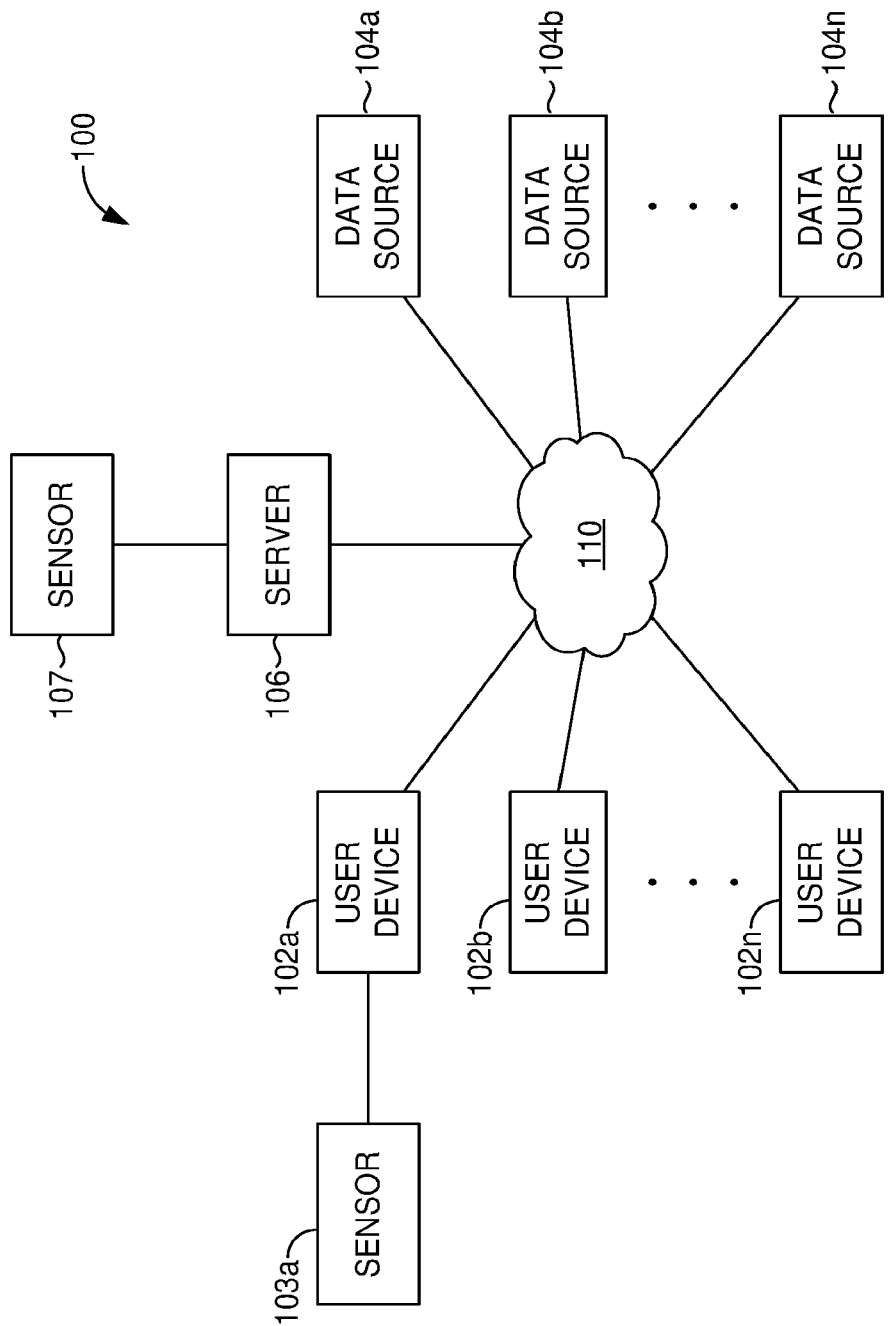
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., data events, data objects, states of a model, states of automaton (e.g., an agent), and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The various embodiments are directed towards enhanced methods of reinforcement learning (RL). More particularly, the embodiments provide various methods to "secure" the behavior of an agent when, to "learn" an optimal (or at least an advantageous) policy that maximizes (or at least increases) an expected return (e.g., the accumulation of rewards), the agent "explores" their environment, rather than "exploit" its current knowledge of the environment. The embodiments are advantageous for various RL applications, including but not limited to RL applications where a large portion of the available actions for a large portion of the environment's states are likely to result in an "undesired" terminal state without achieving and/or performing the "task" associated with the application (e.g., accumulating a large reward as a consequence of the sequence of the agent's actions and corresponding state transitions).

In the various embodiments, the agent's exploration of the environment is secured by learning a secured exploration policy. When learning the secured exploration policy, the probability for taking any action that is likely to result in entering a "dead-end" state is decreased, such that the agent "learns" to avoid dead-end states, where a dead-end state is any state that leads to a undesired terminal state with a probability of (or at least close to) unity. By learning to avoid dead-end states, the agent's secured policy converges to an optimal (or at least an advantageous) policy much more quickly and safely, than conventional RL methods of not securing exploration.

More specifically, a "security condition," (defined by properties discussed below) for a environment of a general decision process is translated into a learning problem. To secure the agent for exploration, a modified decision process (e.g., an exploration decision process) is employed, where the exploration decision process includes a value function that is modified (e.g., "secured"), as compared to the value function of the original decision process. The modified value function constrains (or "caps") the exploration policy. It is shown below that such a "secured" exploration policy converges to an optimal policy. It is also shown that such a secured exploration policy converges, with significantly improved efficiency and safety as compared to conventional RM methods, to an optimal (or at least an advantageous) policy. Thus, the embodiments provided a significantly enhancement (e.g., improved computational efficiency and safety to hardware, property, and humans) for various RL applications.

Because the exploration is secured the various embodiments, the embodiments may be employed in RL applications that include "bridge," or "bridge-like" environments. That is, the embodiments may be employed in applications that may be modeled as a decision process with an environment that includes many dead-end states, where the positive reward states are relatively distant from the states that are likely to be initial states of the application. For example, a bridge-like "game" or task may be a game where many of the available actions available to the agent, at least in the earlier stages of the game, are likely to result in a failure to accomplish the "goal" of the game. Another trait that is common in bridge, or bridge-like, decision processes is that it may be unknown when an agent enters a dead-end state because entering a dead-end state may not generate a detectable signal as such. However, once a dead end state is entered, the agent may undergo an unknown sequence (e.g., random sequence) of actions and states of indeterminate length before transitioning (with a probability equivalent to unity) to the undesired terminal state.

Thus, because many available actions in many states of bridge and bridge-like environments result in a transition to an undetectable dead end state (and an unavoidable "fall" of indeterminate length to an undesired terminal state), unsecured and conventional RL methods are slow to converge to an acceptable policy. Furthermore, unsecured and conventional RL methods may pose safety risks to hardware, tangible property, and individuals when an agent explores and learns in a physical environment. For example, in applications such as autonomous robots, autonomous vehicles (terrestrial or aerial), and therapeutic procedures (e.g., healthcare procedures such as but not limited to drug administration schedules), an agent's "exploration" of a physical environment may result in harm or damage to hardware, tangible property, and/or individuals located within the environment. Thus, the various embodiments may be advantageous to deploy in various physical environments, virtual environments, and/or augmented (e.g., a combination of a physical and a virtual environment) environments, such as but not limited to physical and virtual applications that may be modeled as a bridge-like decision process. Such virtual and physical environments include video games, autonomous vehicles, and therapeutic treatments (e.g., does and frequencies for the administration of pharmaceuticals or other therapeutic interventions). For example, in some embodiments, an agent may securely explore the environment of a video game (e.g., a game that occurs within a virtual, virtualized, and/or augmented environment) in order to securely learn how to "win" the game and/or achieve one more goals and/or objectives of the game. In another non-limiting example, a decision process representing states and actions for administering a therapeutic treatment in a physical environment. For example, an agent may securely learn an efficient, effective, and safe dosage, frequency, and/or sequence of administering one or more pharmaceuticals to one or more patients.

RL methods provide a framework to train an agent to achieve a goal and/or perform a task via performing discrete or continuous actions, within an environment. At any given step during the performance of the task, the agent selects an action based on an observation of their current state within the environment and a policy for selecting the action based on the current state. In response to performing the selected action, the agent observes a transition from the current state to a new state, as well as a corresponding reward. The agent may then update their policy to include information learned via the performance of the action, as well as the resulting state transition and reward. Thus, during training, the agent "learns" knowledge about their environment and the likely consequences (e.g., positive or negative rewards) for their actions. Thus, the goal of RL training is to generate updated knowledge regarding likely consequences (e.g., likely state transitions and rewards) associated with state-dependent actions. More specifically, RL determines and/or updates a policy based on the updated information. Based on their current state, the agent may query the policy to efficiently and safely achieve the goal and/or perform the action.

Once trained (i.e., after a reasonable policy has adequately converged), the agent may be enabled to successfully achieve goals by performing actions in the environment, and receiving corresponding rewards for the performed actions. In general, conventional RL trains an agent to maximize (or at least increase) a total accumulated reward, while the agent iteratively learns to achieve the goal or perform the task. RL is often employed in applications where the environment, the agent's available actions, and the corresponding rewards can be modeled as a decision process, including but not limited to a Markov Decision Process (MDP). For example, conventional RL is often deployed in the context of training an agent to achieve a goal and/or perform a task within the context of a game that is modeled as a decision process.

In many real-world applications, the decision process's state transition probabilities, as well as associated rewards are not known a priori. During the learning phase, the agent must "explore" the environment and available actions to gradually learn state transition probabilities and the rewards (e.g., positive and/or negative consequences for their actions). Often, during the learning (or training) phase, the agent balances "exploiting" their current level of knowledge (of the state transition probabilities and rewards) and "exploring" the environment to update their current level of knowledge, with information determined via the "exploration" actions. When exploiting their current level of knowledge, the agent chooses an action that, based on the current level of knowledge and their current state in the environment, is likely to result in the largest possible reward. That is, during exploitation, the agent chooses a "greedy" action. Thus, when exploiting, the agent increases their total accumulated reward, but generates little information to update their current level of knowledge. Furthermore, even though the agent increases the total accumulated reward, it may be unlikely that the total accumulated reward is maximized when exploiting. Exploration (and the associated new information) may be employed to maximally increase the total accumulated reward. For example, when exploiting, an agent may be unlikely to find a more efficient, "safer," or more rewarding sequence of actions to achieve the goal and/or perform the task.

When exploring, the agent may select an action via a randomized and/or stochastic process, where the action is selected based on a probability distribution (e.g., uniform, Boltzmann, and the like). After performing the selected action and observing the corresponding state transition and associated reward, the agent may update their current level of knowledge. Thus, exploration generates information regarding state transition probabilities and (positive and negative) rewards that would not otherwise be discovered via exploitation. However, exploring "uninteresting" portions of the environment (uninteresting in the context of achieving the desired task) may result in wasted training efforts that generate little to no relevant information. Furthermore, exploring "dangerous" or "unsafe" portions of the environment (e.g., dangerous to the agent's or other's safety) may be costly and/or raise safety concerns. Thus, the agent's needs to generate new information must be balanced with considerations associated with limited training time, as well as cost and safety concerns.

An ε-greedy policy, or another such stochastic policy, may be employed to balance the exploration and exploitation of the environment, where $\varepsilon \in [0,1]$ indicates a relative ratio between the exploitation and the exploration of the environment. The value of ε may be dynamically varied during the training. For example, during the initial phases of training, ε may be relatively large, resulting in the agent generating significant new knowledge via exploration. During the later stages of training, and after the agent's exploration has generated a significant amount of knowledge, the value of ε may be decreased, such that the agent spends more time exploiting their knowledge and avoiding non-relevant and/or unsafe portions of their environment.

As noted above, such conventional RL methods may require a significant number of training iterations to converge on a trained policy that an agent may employ to that achieve the desired goal and/or perform the task in a reasonable amount of time, and without endangering physical assets, such as hardware. That is, during conventional RL training, the agent may be slow to converge on a reasonable policy. Thus, significant computational resources may be required to conventionally train an agent. Furthermore, in physical scenarios (e.g., when the agent is embedded in a robot or an autonomous vehicle), hardware or other physical assets may be subject to significant damage during training. For example, when training a robot to walk across a table via conventional RL, the robot may frequently fall off the table when exploring their environment. The cost of repairing and/or replacing the robot when the robot frequently falls off the table by exploring their environment, may render conventional RL impractical. Such physical scenarios may also give rise to human and/or environmental safety concerns. For instance, conventionally training an autonomous vehicle to navigate city streets may endanger nearby pedestrians, drivers of other vehicles, or tangible property (e.g., the autonomous vehicle and/or the other vehicles).

Many MDPs (or other types of decision processes) are subject to conditions, where at many states, a large portion of the available actions are likely to result in an undesired terminal state (e.g., a robot falling off a table or the agent losing a game or failing to achieve the goal). Also, many interesting applications of RL involve decision processes that include many "dead-end" states. Upon reaching a dead-end state, the agent continues to interact with the environment, but cannot reach a "desired" terminal state (e.g., the robot reaching the other end of the table or the agent winning the game or achieving the goal), regardless of whatever actions are chosen by the agent. That is, once an agent enters a dead-end state, the agent is guaranteed to arrive at an undesired terminal state. Upon arriving at the undesired terminal state (e.g., the agent losing a life or credit in a game), the agent may be returned to an initial state, where the training continues. Furthermore, in many such applications, the agent may spend an unknown and/or random number of steps between first entering a dead-end state and reaching the undesired state. That is, the length of a "dead-end trajectory" may be unknown and/or random.

In various embodiments, a terminal state is any state of the agent and/or the decision process, where the agent's actions (and/or dynamics of the decision process or game) are terminated (e.g., achieving a task, losing a game, winning the game, achieving an object or task within the game, losing a life and/or credit in the game, tying a (real or virtual) opponent in the game, leaving the game, exiting a virtual environment, and the like) at the terminal state. The set of all possible states of a decision process may be referenced as $\mathcal{S}$. The set of all terminal states may be referenced as $\mathcal{S}_T \subset \mathcal{S}$. A state $s_u$ is an undesired terminal state if reaching $s_u$ prevents reaching a maximum return and/or accumulated reward. The set of all undesired terminal states may be referenced as $\mathcal{S}_u \subset \mathcal{S}_T \subset \mathcal{S}$, where $s_u \in \mathcal{S}_u$. An undesired terminal state may include losing the game, losing a life and/or credit in the game, tying a (real or virtual) opponent in the game, and the like. A terminal state that is not an undesired terminal state may be a desired terminal state. A desired terminal state may include achieving a task, winning the game, achieving an object or task within the game, and the like.

A state s' may be a dead-end state if all possible trajectories starting from s' reach an undesired terminal state with a probability equal to 1 (or at least close to unity) in some finite (but possibly random) number of steps. That is, a dead-end state is a state where all possible trajectories from the state are dead-end trajectories. Accordingly, all states within a dead-end trajectory (that is, all states reachable from a dead-end state) are themselves dead-end states. The set of dead-end states may be referenced as $\mathcal{S}_D$.

For example, when an agent is trained to traverse a "bridge" in a game, many available actions may result in the agent falling from the bridge. Upon falling, the agent may enter an inescapable, uncontrollable, and/or random length trajectory (i.e., a dead-end trajectory) before the game terminates and/or the agent losses a life or credit. Thus, in such "bridge" or "bridge-like" applications, many available actions place the agent in a dead-end state and thus a dead-end trajectory of unknown and/or random length. That is, bridge effects may exist for a decision process, where for a large number of available actions at a large portion of the agent's states, a significantly probability exists that, upon execution of the action, the agent is transitioned from their current state to a dead-end trait. Another characteristic of bridge or bridge-like decision process that it may be unknown when an agent enters a dead-end state because entering a dead-end state may not generate a detectable signal as such. However, once a dead end state is entered, the agent may undergo an unknown sequence (e.g., random sequence) of actions and states of indeterminate length before transitioning (with a probability equivalent to unity) to the undesired terminal state.

More specifically, a bridge effect exists in an environment of a decision process, if under a uniform policy, the probability of reaching a positive reward in N steps is less than that of transitioning into a dead-end state, for all integer N greater than 1. An decision process (or environment thereof) may be a bridge or bridge-like decision process if the decision process has a bridge effect. A bridge or bridge-like decision process may be employed in applications that may be modeled with an environment that includes many dead-end states, where the positive reward states are relatively distant from the states that are likely to be initial states of the application.

The various embodiments are employable for MDPs (or other types of decision processes) that include bridge effects. More generally, the various embodiments may be employable various "Metroidvania" games. That is, the embodiments are employable in games that feature an explorable and interconnected virtualized environment. Access to portions of the environment may be limited by obstacles, such as but not limited to doors. A player of the game (e.g., an agent) may acquire items, such as tools, weapons, fuel, abilities, nutrition, points, flags, extra lives, money or the like, by acquiring access to obstructed portions of the environment. The performance of a task within the game may include acquiring one or more such items. Performing such a task may include winning the game. A bridge-like Metroidvania game may include a game wherein naively, randomly, or uniformly exploring the environment has a high probability of transitioning to a dead-end state.

For example, a bridge-like "game" (or performance of a task within the game) may be a game where many of the available actions available to the agent, at least in the earlier stages of the game, are likely to result in a failure to accomplish the "goal" or "task" of the game. As a non-limiting example, a video game may include a random length animation sequence upon entering a dead-end state (e.g., falling off the bridge). The dead-end states are typically unknown prior to training, and the unknown and/or random length of dead-end trajectories makes identifying and tagging such dead-end states difficult via conventional RL methods. That is, the various embodiments may be applied for MDPs (or other types of decision processes), where the set of dead-end states is unknown and/or a readily detectable signal is not generated when the state of the agent is transitioned to a dead-end state. Also, the embodiments may be applied for MDPs (or other types of decision processes) where the length of the dead-end trajectories for the dead-end states are unknown and/or random.

Conventional RL methods may not readily identify and avoid such unknown dead-end states. Furthermore, any time the agent spends training during the trajectory between the dead-end state and the undesired terminal state (i.e., during the dead-end trajectory), does not generate relevant information for which the agent can update their current level of knowledge. Thus, employing conventional RL to decision processes that are subject to such "bridge-" like conditions may result in unacceptably long training times and/or unacceptable cost and/or safety concerns, via conventional RL methods.

The various embodiments herein address these and other limitations of conventional RL methods by providing an exploration agent that is secured. As discussed throughout, securitizing an exploration agent includes training the exploration agent to avoid dead-end states and dead-end trajectories. That is, during training, the exploration agent "learns" to identify and avoid dead-end states of the decision process, and is this secured in its exploration. Accordingly, the secured exploration agent may be utilized to safely and efficiently explore the environment, while significantly reducing the training time, as well as the cost and safety concerns associated with conventional RL. The secured exploration agent may be employed to guide the behavior of a corresponding exploitation agent. In some embodiments and during training, the policy of the exploration agent is iteratively updated to reflect an estimated probability (or likelihood) that a state is a dead-end state. The probability (or likelihood) that the exploration agent chooses an action (via a secured exploration policy) that results in a transition to a dead-end state is reduced to reflect the estimated likelihood that the state is a dead-end state. Thus, the exploration agent learns to avoid dead-end states, significantly reducing the training time, as well as the cost and safety concerns associated with conventional RL training methods.

As noted throughout, the various embodiments may be applied to decision process models, such as but not limited to a Markov Decision Process (MDP). The variously embodiments discussed below are discussed in conjunction with a MDP. However, it should be understood that each of the various embodiments may be applied to types of decision process models other than an MDP. Thus, without loss of generality, the embodiments may be applied to decision processes (or decision-making) applications that are not modeled as a MDP.

As indicated throughout, an MDP (or other types of decision processes) may be characterized as $\mathcal{M}=(\mathcal{S},\mathcal{A},T,r,\gamma)$, where $\mathcal{S}$ and $\mathcal{A}$ are discrete or continuous sets of states and actions respectively. T: $\mathcal{S} \times \mathcal{A} \times \mathcal{S} \to [0,1]$ is a state transition function that defines the transition probability from state s to s' under action a and r: $\mathcal{S} \times \mathcal{A} \times \mathcal{S} \to [r_{min}, r_{max}]$ is a reward function and $\gamma \in [0,1]$ denotes a scalar discount function, explained below. A policy $\pi(s,\alpha)=\mathbb{P}[A_t=\alpha|S_t=s]$ defines a conditional probability for the agent to select action a, given an observation that the agent's current state is state s. An action-value function (for policy $\pi$) $Q(s,\alpha)=\mathbb{E}^\pi[\Sigma_{j=0}^\infty \gamma^j r^{j+1}|S_0=s,A_0=\alpha]$ is defined to evaluate the expected return of taking action a, at state s and following policy $\pi$ thereafter. In typical RL applications, the state transition function and the reward function are unknown. Thus, the action-value function is unknown. The agent may explore the environment to iteratively "learn" the action-value function. More specifically, Q-learning methods may be employed to iteratively learn and/or determine the action-value function a policy. Thus, various methods, including but not limited to ε-greedy Q-learning methods, Boltzmann Q-learning methods, and/or count-based Q-learning methods may be employed to iteratively determine the action-value function and discriminate between policies based on the corresponding action-value functions. Training the agent includes determining a policy that will enable the agent to safely and efficiently achieve the goal and/or perform the task in a reasonable safe and efficient manner. In many applications, the more efficient and/or the more safely the agent achieves the goal and/or perform the task, the better the policy. Thus, determining a policy may include attempting to select actions that maximize the expected return, as determined via $Q(s,\alpha)$.

In the various embodiments, $\mathcal{S}_T \subset \mathcal{S}$ is the non-empty subset of S that includes all terminal states of the MDP. As noted above, a terminal state is defined as a state at which either the environment terminates its dynamics and/or the agent ignores any rewards thereafter. In the various embodiments of an MDP, there exists at least one non-zero probability trajectory from each of the states to at least one terminal state. That is, there is no inescapable subspaces without a trajectory to a terminal state.

Also as noted above, an undesired terminal state: $s_u \in S_u \subset S_T$ is formally defined as a terminal state, where $r(s,\alpha,s_u) \leq 0$ for all $(s,\alpha) \in S \times \mathcal{A}$. A desired terminal state $s_{DT} \in S_{DT} \subset S_T$ is a terminal state, where $r(s,\alpha,s_{DT}) > 0$ for at least one $(s,\alpha) \in S \times \mathcal{A}$. Thus, a desired terminal state may be a state that includes the agent achieving the goal or completion of the task. A state s' is formally defined as a "dead-end" state if and only if: (1) no transition to s' is positively rewarded, (2) all the trajectories starting from s' include no positive rewards, and (3) all the trajectories starting from s' reach an undesired terminal state with probability equal to 1.0 in some bounded (possibly random) number of steps l. The set of all dead-end states is denoted by $S_D$. It can be shown via induction that if a particular state is a dead-end state, then all states reached after the particular dead-end state in all possible trajectories are also dead-end states. A trajectory initiating from a dead-end state may be referred to as "dead-end trajectory." The length l of a dead-end trajectory may be random and/or unknown.

An MDP (or other models of a decision process) is said to include a bridge effect or "bridge condition" if, under a uniform policy, the probability of reaching an undesired terminal state in N steps is smaller than that of transitioning into a dead-end state, for all N>1. That is, under a bridge effect, there exists a non-zero and non-negligible probability of transitioning to a dead-end state, from most states (or at least in all trajectories from an initial state to any positively rewarded transitions). Furthermore, in many embodiments, any desired terminal state is relatively far from the initial state. Note that during training, undesired terminal states may be identified and/or characterized. However, dead-end states are typically unknown, and at least due to the random and/or unknown length (l>1) of the corresponding dead-trajectories, conventional RL methods may not readily identify and/or characterize dead-end states. Thus, conventional RL methods may be impractical for MDPs that exhibit a bridge condition. That is, because training an agent exposed to bridge conditions via conventional RL methods results in the agent spending a significant amount of training time in dead-end trajectories, training such a conventional agent may require a significant number of training iterations to converge on a reasonable policy. In the various embodiments, and in contrast to conventional RL methods, the secured exploration agent learns to characterize dead-end states, via an estimated probability, and avoids transitioning into the identified dead-end states, via the estimated probability.

The exploration agent learns and employs a secured exploration policy $\eta: S \times \mathcal{A} \rightarrow [0,1]$. When not exploring the environment, an exploitation agent employs an exploitation policy $\pi: S \times \mathcal{A} \rightarrow [0,1]$. As used herein, a policy ($\eta$) is referred to as "secure policy," when the policy includes Property 1:

$\eta(s,\alpha) \leq \lambda$, for any $\lambda \in [0,1]$,
where $\Sigma_{s' \in s_D} T(s,\alpha,s') \geq 1-\lambda$ The above property (i.e. Property 1) of the policy may be considered a property of a secure (or secured) policy. That is, a policy is a secure policy when, if the state-action pair $(s,\alpha)$ results in a transition to a dead-end state with probability $1-\lambda$, then the probability of taking action a while at state s, via the policy, is reduced via the following inequality: $\eta(s,\alpha) \leq \lambda$. Thus, a policy that conforms to Property 1, is a secure exploration policy that secures the exploration with respect to dead-end states, via probability $\lambda$. Thus, such a secure policy enables secure exploration of the environment. It can be shown that if (1) the states and actions of an MDP are finite, (2) a policy that satisfies above Property 1 is employed to explore the environment, where during exploring, the policy visits all of the non-dead end state an infinite number of time, and (3) $q_\pi(s,\alpha)$ is initialized to 0.0 for all state-action pairs and standard conditions apply on the exploitation training step-size parameter $\alpha_\pi$, then Q-learning will enable the convergence of $q_\pi(s,\alpha)$ onto $q_\pi^*(s,\alpha)$, where $q_\pi(s,\alpha)$ is the Q-learning generated estimate for the exploitation action-value function and $q_\pi^*(s,\alpha)$ is the theoretically optimal exploitation action-value function for the MDP (e.g., $q_\pi^*(s,\alpha)$ may be the optimal value function of an exploration MDP, $\mathcal{M}_e$ as discussed below). The guaranteed convergence of $q_\pi$ onto $q_\pi^*(s,\alpha)$, when the above three conditions apply, may be herein be referred to as Theorem 1. A formal proof of Theorem 1 is provided via FIG. 6A.

Theorem 1 implies that, provided a sufficient number of training iterations, off-policy Q-learning can be employed to determine $q_\pi$ to any degree of desired accuracy. It can be shown that this result applies to other forms of Q-learning, such as not limited to ε-greedy Q-learning methods, Boltzmann Q-learning methods, and/or count-based Q-learning methods that balance exploitation policy ($\pi$) and the exploration policy ($\eta$). Note that when the exploration policy satisfies the above Property 1, for an MDP that includes a bridge effect, the exploration policy learns to avoid actions that likely result in transitions to likely dead-end states. In further contrast to conventional RL methods, because once learned, the likely dead-end starts are largely avoided during exploration, the number of training iterations required for the desired convergence of $q_\pi$ is significantly reduced.

Note that the transition probability function $T(s,\alpha,s')$ of Property 1, as well as information regarding the dead-end states, are typically unknown. Thus, conventional RL methods are not enabled to deploy a secure exploration agent that includes Property 1. In the various embodiments, enhanced RL methods are employed to learn the exploration policy. More specifically, in the embodiments, the exploration policy is related to a second action-value function ($q_e$) of second MDP ($\mathcal{M}$) that is based on the original MDP ($\mathcal{M}$). $\mathcal{M} = (S, \mathcal{A}, T, r_e, \gamma_e)$ is referred to as the "exploration MDP" and includes the same state and action spaces, as well as the same state transition function, as the original (or primary) MDP. However, the exploration reward function ($r_e$) and the exploration scalar factor ($\gamma_e$) are different than those of the primary MDP. In the various embodiments, the exploration agent is secured via the learning of the exploration action-value function ($q_e$) of the exploration MDP. Note that the exploration policy is related to the exploration action-value function, but is not an optimal policy of $\mathcal{M}_e$, because the exploration policy must explore the environment, and thus not always choose the greediest action, as indicated via the exploration action-value function, i.e., $\text{argmax}(q_e^*(s,\alpha))$.

In various embodiments, the undesired terminal states are known and the exploration reward function ($r_e$) is initialized such that $r_e = -1$ for transitioning to an undesired terminal state and $r_e = 0$ for all other transitions. During the training, the exploration reward function is iteratively updated such that the exploration reward function converges to $r_e = -1$ for all transitions to undesired terminal states, $-1 < r_e < 0$ for all transitions to dead-end states, and $r_e = 0$ for all other state transitions. The magnitude (or absolute value) of the exploration reward function for transitions to dead-end states depends upon the length of the (random) trajectories from the dead-end state to an undesired terminal state. Property A (PA) is defined as the initialization of the exploration reward function, PA: $r_e=-1$ for all transitions to undesired states and 0.0 for all other transitions. Property B (PB) is defined as no discount for exploration, i.e., PB: $\gamma_e=1.0$. $q_e^*$ indicates a theoretically optimal exploration action-value function for an exploration MDP ($\mathcal{M}_e$), where the exploration reward function satisfies PA and the exploration scalar factor ($\gamma_e$) satisfies PB. μ is an arbitrary policy that satisfies the inequality indicated Property C (PC), where PC:$\mu(s,\alpha) \leq 1+q_e^*(s,\alpha)$, $\forall (s,\alpha) \in \mathcal{S} \times \mathcal{A}$. It can be shown that is PA, PB, and PC are satisfied, then μ is a secure policy, as defined by Property 1 above. The guaranteed security of a policy, when PA, PB, and PC are satisfied may be herein referred to as Theorem 2. Note that the secure policy is a probabilistic or stochastic policy and not the optimal policy for the exploration MDP. A formal proof of Theorem 2 is provided via FIG. 6B. Note that in the formal proof shown in FIG. 6B, PA and PB are referred to as P1 and P2 respectively.

Note that Theorem 2 may be employed to translate Property 1 (i.e., definitional conditions required for a secure policy) to an enhanced RL method for determining a secure policy via the removal of the explicit dependence on the unknown state transition probability function (T(s,α,s')) and the unknown information regarding the dead-end states. That is, an exploration policy may be secured via the learning of $q_e^*(s,\alpha)$. Via Theorem 1, the convergence of an estimated exploitation action-value function ($q_e$) to $q_e^*(s,\alpha)$ to any desired accuracy is guaranteed. Via Theorem 2, a "security cap" (κ) is defined as $\kappa(s,\alpha)=1+q_e(s,\alpha)$ and an "optimal security cap" (κ*) is defined as $\kappa^*(s,\alpha)=1+q_e^*(s,\alpha)$. Thus, Theorem 2 enables the determination of "cap" to "clip" the exploration policy based on an estimated exploration action-value function. To address a bridge effect-prone MDP, a model that assumes information of the state transition probabilities and the dead-end states may not be required in the herein enhanced embodiments, i.e., model free RL methods may be employed to securely train an agent in an environment characterized by an MDP that includes bridge effects.

In the various embodiments, a "presumption of innocence" is initially applied to the actions, i.e., all actions are initially equally probable under the security cap. Thus, secured exploration policy is determined by keeping the inequality of PC. The secured exploration policy may be determined and normalized via equation (1) below.

$$\eta(s, a) = \frac{1 + q_e(s, a)}{\sum_{a'} 1 + q_e(s, a')} = \frac{1 + q_e(s, a)}{n_a + \sum_{a'} q_e(s, a')}$$

In the various embodiments, $q_e(s,\alpha)$ is initialized to be identically 0.0 for all state action pairs. Because all the exploration rewards are constrained to be included in the interval [−1.0, 0.0], the exploration policy is properly defined as a normalized probability within the interval [0.0, +1.0]. Thus, initially, the exploration policy includes a uniform distribution. During training, the probability of taking an action is decreased as it is determined the action will likely will result in a transition of a dead-end state. Note that the exploration policy is insensitive to the scalar factor (γ) of the primary MDP ($\mathcal{M}$). Thus, the exploration policy is sensitive only to dead-end states and to state transitions into a dead-end trajectory. Due to the initialization of $q_e(s,\alpha)$, during training and before the exploration agent reaches a desired terminal state, the following equality holds:

$$q_e(s, a) = -\sum_{s' \in S_D} T(s, a, s') + \sum_{s' \notin S_D} T(s, a, s')_{a'}^{max}(q_e(s', a'))$$

Thus, when $q_e(s,\alpha)$ is initialized as described above, then $$\max_{a'} (q_e(s', a')) \leq 0 \text{ and } q_e(s, a) \leq -(1 - \lambda).$$

Thus, the security cap applies, prior to the convergence of $q_e(s,\alpha)$. A "secured random walk" is defined via the secured exploration policy below $$\eta(s, \cdot) \equiv \begin{cases} 1/n_a, & \text{if } q_e(s, a') = -1, \forall a' \in \mathcal{A} \\ \dfrac{1 + q_e(s, \cdot)}{n_a + \sum_{a'} q_e(s, a')}, & \text{otherwise} \end{cases}$$

Thus, via the secured random walk (SRW), Property 1, PA, PB, and PC are guaranteed. Accordingly, Theorem 1 and Theorem 2 applies, and the convergence of $q_e(s,\alpha)$, via Q-learning is guaranteed. Thus, a secured exploration agent may be generated to for an MDP subject to bridge effects.

In some embodiments, a security threshold may be set on state-action values. The security cap may be employed to not allow non-secure actions. For example, when the state-action value for a particular action exceeds the security cap, the action will not be performed. Theorem 3, stated below guarantees that a security cap exists and may be determined to exclude non-secure actions from consideration, while still being able to consider secure actions.

Theorem 3 may be stated as: under PA and PB, let $v_e^*$ and $q_e^*$ be the theoretically optimal state and the theoretically optimum state-action value function of $\mathcal{M}_e$, respectively. Then, unless T(s,α,s')=1, there exists a gap between $v_e^*(s')$ and $q_e^*(s,\alpha)$ for all $\alpha \in \mathcal{A}$, all dead-end states s' and all non-dead-end states s. Furthermore, the gap is independent of length of a dead-end trajectory. FIG. 6C provides a formal proof for Theorem 3. A formal proof of Theorem 2 is provided via FIG. 6B. Note that in the formal proof shown in FIG. 6B, PA and PB are referred to as P1 and P2 respectively.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n;

server 106; sensors 103a and 107; and network 110. It should be understood that environment 100 shown in FIG. 1A is an example of one suitable operating environment. Each of the components shown in FIG. 1A may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. (For instance, in one embodiment, one or more data sources 104a through 104n provide (or make available for accessing) and MDP subject to bridge effects Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
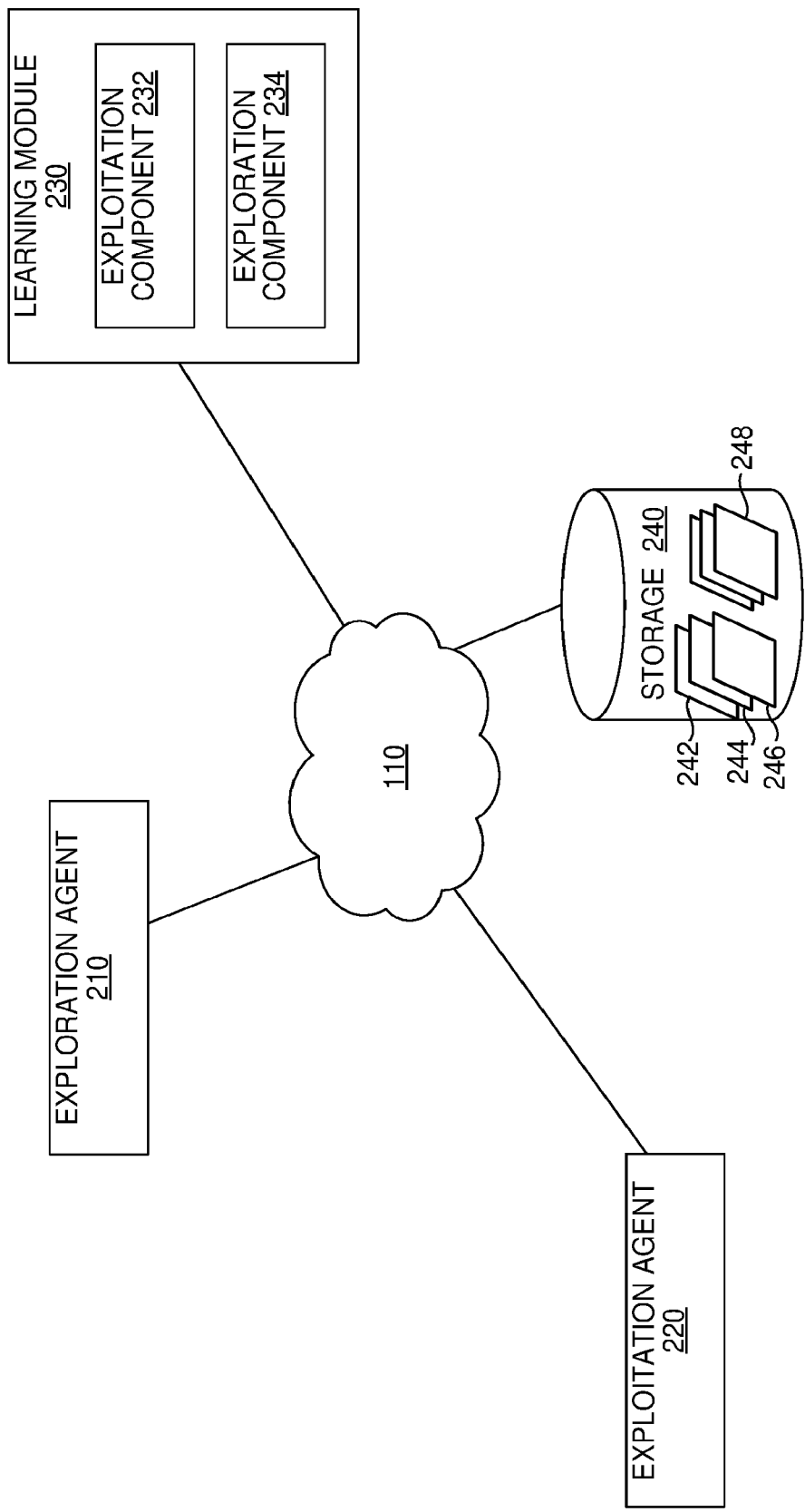
FIG. 2 is a block diagram illustrating an secure exploration system in which some embodiments of the present disclosure may be employed.

Operating environment 100 can be utilized to implement one or more of the components of system 200, described in FIG. 2, including components for training a secure exploration agent. Operating environment 100 also can be utilized for implementing aspects of process flows 300 and 400 described in conjunction with FIGS. 3-4A.

Referring now to FIG. 2, in conjunction with FIGS. 1, a block diagram is provided showing aspects of an example computing system architecture suitable for implementing an embodiment of the disclosure and designated generally as a secured reinforcement learning (RL) system 200. As noted throughout, secured RL system 200 may be employed to deploy RL to various applications that may be modeled as a finite Markov Decision Process (MDP). As also discussed throughout, secured RL system includes significant benefits over conventional RL systems, especially when the MDP exhibits bridge effects or conditions. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The secured RL system 200 includes network 110, which is described in connection to FIG. 1A, and which communicatively couples components of system 200, including but not limited exploration agent 210, exploitation agent 220, learning module 230, and storage 240. Storage 40 may store one or more primary and/or exploration MDPs 242, exploration and/or exploitation policies 244, and exploration and/or exploitation action-value functions 246, as well as logic and/or machine instructions 248 that enable implementing any of the various actions, operations, or methods discussed herein.

Learning module 230 is generally responsible for deploying the enhanced RL methods discussed herein to train the exploration agent 210 and the exploitation agent 220, based on one or more MDPs. As such, learning module 230 includes an exploitation component 232 and an exploration component 234. The exploitation component 232 is generally responsible for training the exploitation agent 220 and the exploration component 234 is generally responsible for training the exploration agent 210. As discussed throughout, the exploration agent 210 is generally trained to deploy a secured exploration policy and the exploitation agent is generally trained to deploy a greedy exploitation policy. Learning module 230 may employ the logic and/or machine instructions 248 to train the respective agents. As such, logic and/or machine instructions 248 may enable the various enhanced RL training methods discussed throughout.

Figure 3:
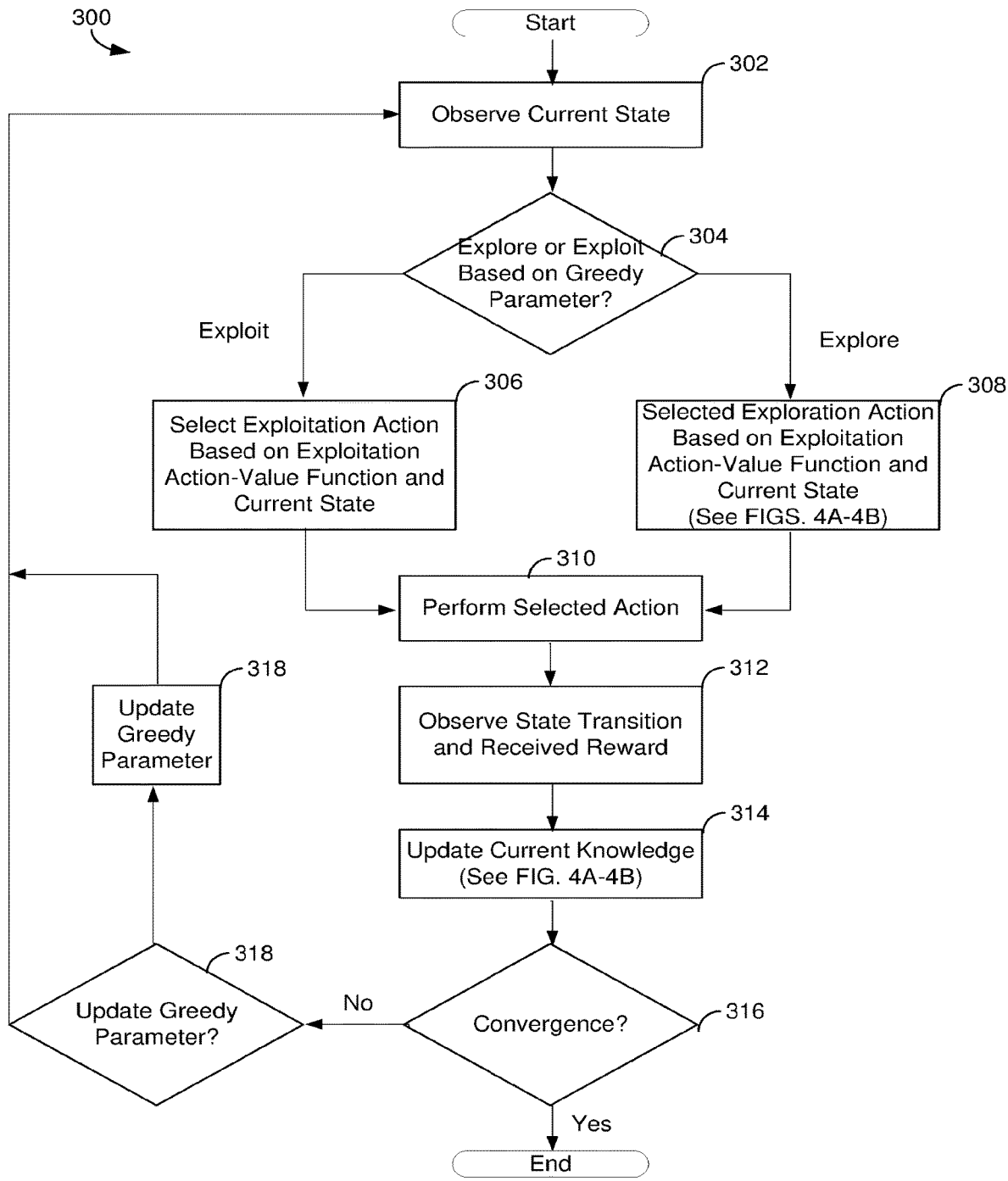
FIG. 3 shows a flow diagrams that illustrates a method for securely deploying reinforcement learning (RL) in accordance with an embodiment of the present disclosure.

Turning now to FIG. 3, a flow diagram is provided that illustrates a method 300 for securely deploying reinforcement learning (RL) in accordance with an embodiment of the present disclosure. At least portions of method 300 may be enabled by, performed by, and/or carried out by devices and/or components included in operating environment 100 of FIG. 1 and/or secure RL system 200 of FIG. 2. Process 300 is discussed in conjunction with an Markov Decision Process (MDP), such as but not limited to the MDPs discussed above.

More particularly, process 300 may be employed to securely train an exploitation agent and an exploration agent, when the MDP exhibits bridge effects. Process 300 begins, after a start block, where a current state (s) is observed. At decision block 304, it is determined whether to explore or exploit the environment of the MDP based on a greedy parameter, such as but not limited to ε, as discussed above. If the current knowledge is to be exploited, process 300 flows to block 306. If the environment is to be explored, process 300 flows to block 308. At block 306, and exploitation action is selected based on current knowledge of an exploitation action-value function ($q_\pi(s,\alpha)$) and the current state s. Thus, in some embodiments, a current version of a greedy or exploitation policy ($\pi(s,\alpha)$) is employed to selection the exploitation action at block 308.

At block 308, an exploration action is selected based on current knowledge of an exploration action-value function ($q_e(s,\alpha)$) and the current state s. Various embodiments for selecting a exploration action are discussed in conjunction FIGS. 4A-4B. However, briefly here, the exploration action may be selected via a secured exploration policy ($\eta(s,\alpha)$). From each of block 306 and 308, process 300 flows to block 310, where the selected exploitation or exploration action is performed. In respond to performing the selected action, a state transition from current state s to an updated state s', as well as a corresponding rewards r is generated. At block 312, the state transition and corresponding reward is observed.

At block 314, various components of the current knowledge of MDP are updated based on the observed state transition and reward. Various embodiments of updated the current knowledge are discussed in conjunction with at least FIGS. 4A-4B. However, briefly here, in various embodiments, the exploitation and/or exploration policies may be updated, as well as the exploitation and/or exploration action-value functions and exploration reward functions may be updated at block 314. At decision block, a policy is tested for convergence. If the policy has converged, then process 300 terminates. Otherwise, process 300 flows to decision block. At decision block 318, it is determined whether to update the greedy parameter. Determining whether to update the greedy parameter may be based on the updated current knowledge and/or one or more convergence metrics. For instance, as knowledge is generated, the value of the greedy parameter may be decreased. If the value of the greedy parameter is not updated, process 300 returns to block to continue training. Otherwise, process 300 flows to block 318, where the value of the greedy parameter is updated. For example, the value of the greedy parameter may be decreased, such that less exploration of the environment is performed. Form block 318, process 300 returns to block 302.

Figure 4A:
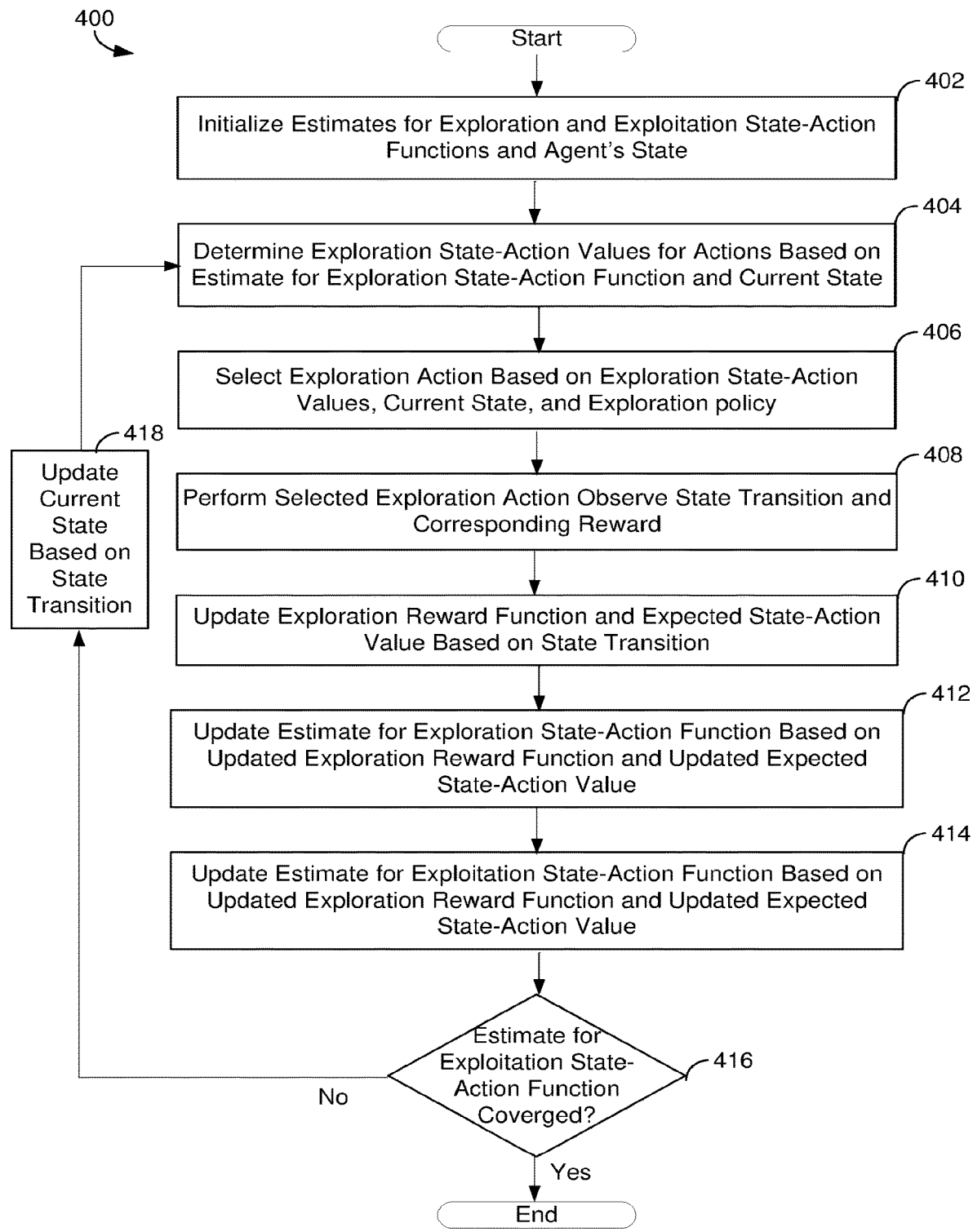
FIG. 4A shows a flow diagram that illustrates a method for securely training an exploration in accordance with an embodiment of the present disclosure.

FIG. 4A provides a flow diagram is provided that illustrates a method 400 for securely training an exploration in accordance with an embodiment of the present disclosure. At least portions of method 400 may be enabled by, performed by, and/or carried out by devices and/or components included in operating environment 100 of FIG. 1 and/or secure RL system 200 of FIG. 2. Process 400 is discussed in conjunction with a Markov Decision Process (MDP), such as but not limited to the MDPs discussed above.

More particularly process 400 is directed towards the secure random walk (SRW) discussed above. Due to the finite nature of a SRW, a SRW may be implemented via tabular settings. In other embodiments, process 400 may be extended for deep RL applications. Q-learning is employed to simultaneously and iteratively determine estimates for both the exploitation state-action value function ($q_\pi$) and the exploration state-action value function ($q_e$) via off-policy learning. However, similar to process 300 of FIG. 3, process 400 may be adapted to gradually switch from the secure exploration policy ($\eta$) to a greedy exploration policy ($\pi$), via an ε-greedy mechanism, or another similar stochastic mechanism. FIG. 4B, provides pseudo-code 420 for implementing at least portions of method 400.

Process 400 begins, after a start block, where the estimate for the exploration state-action value function ($q_e$) and estimate for the exploitation state-action value function ($q_\pi$) are initialized for all state-action pairs ($\alpha$,s). Also, at block 402, an initial state may be initialized as s, as well as the exploration and exploitation learning step size parameters ($\alpha_e$ and $\alpha_\pi$ respectively) may be set and/or defined. Lines 422 of pseudo-code 420 shows implementations for block 402.

At block 404, the exploration state values for all available actions are determined based on the current estimate for the exploration state-action function and current state. At block 406, an exploration action is selected based on the exploration state-action values (determined at block 406), the current state (s), and the exploration policy ($\eta$). As shown in lines 424 of pseudo-code 420, when the exploration state-action value is equal to $-1$ ($q_e(s,\alpha)=-1$) for all available actions, then an exploration action is stochastically selected based on a uniform distribution of actions: $(\mathcal{U}(\mathcal{A}))$. This condition is satisfied when all available actions lead to an undesired terminal state. Otherwise, (when there is at least one available action that does not lead to a undesired terminal state) as shown in lines 426 of pseudo-code 420, the exploration action is stochastically selected based on the exploration policy, which is computed via equation 1.

At block 408, the exploration agent performs the selected exploration action. In response to performing the selected exploration action, the resulting state transition and corresponding rewards are observed, as shown in line 428, r and s' indicate the corresponding reward and new state. Note that the reward observed at block 408 may be the primary reward from the primary MDP. At block 410, the exploration reward function ($r_e$ (s,α)) and the expected state-action value ($q_e'$ (s,α)) is updated based on the state transition. That is $r_e(s,\alpha)$ and $q_e'(s,\alpha)$ are updated based on the newly state s' observed in block 408. Lines 430 of pseudo-code 420 illustrate that if s' is an undesired terminal state, then $q_e'(s,\alpha)$ is updated to 0.0 and $r_e(s,\alpha)$ is updated to be $-1.0$. If s' is not an undesired terminal state, then lines 432 show that $q_e'(s,\alpha)$ is updated to be set as $\max_\alpha q_e(s=s',\alpha')$ and $r_e(s,\alpha)$ is updated to be 0.0.

At block 412, the estimate for the exploration state-action function is updated based on the updated exploration reward function and the updated expected state-action value. Line 434 of pseudo-code shows update the exploration state function via the following expression:

$$q_e(s,\alpha) \leftarrow (1-\alpha_e)q_e(s,\alpha)+\alpha_e(r_e+q_e')$$

At block 414, the estimate for the exploitation state-action function is updated based on the updated exploration reward function and the updated expected state-action value. Line 436 of pseudo-code shows update the exploitation state function via the following off-policy expression:

$$q_\pi(s,\alpha) \leftarrow (1-\alpha_\pi)q_\pi(s,\alpha)+\alpha_\pi(r_\pi+\gamma_\pi \max x_{a' \in \mathcal{A}} q_\pi(s',a'))$$

At decision block 416, and as shown in line 440 of pseudo-code 420, it is determined whether the estimate for the exploitation state-action function has converged. If $q_e(s,\alpha)$ has converged, then process 400 terminates. Otherwise, as shown via loop 442 of pseudo-code 420, process 400 flows to block 418. At block 418, and as shown in line 428, the current state (s) is updated to be set to the new state (s') observed in block 408. Process 400 returns to block 404 to continue the training of the secured exploration agent.

As noted above, various secure random walk (SRW) implementations may be generalized to deep RL applications. That is, various embodiments may be employed in deep RL (DRL) applications, where the Q-learning is implemented via one or more deep neural networks. Various embodiments may be employed in application where a deep Q-Network (DQN) is employed. The secured exploration of the various embodiments may be combined with of exploration methods because the security property, as defined herein, may be an orthogonal exploration strategy to other exploration strategies.

Figure 5A:
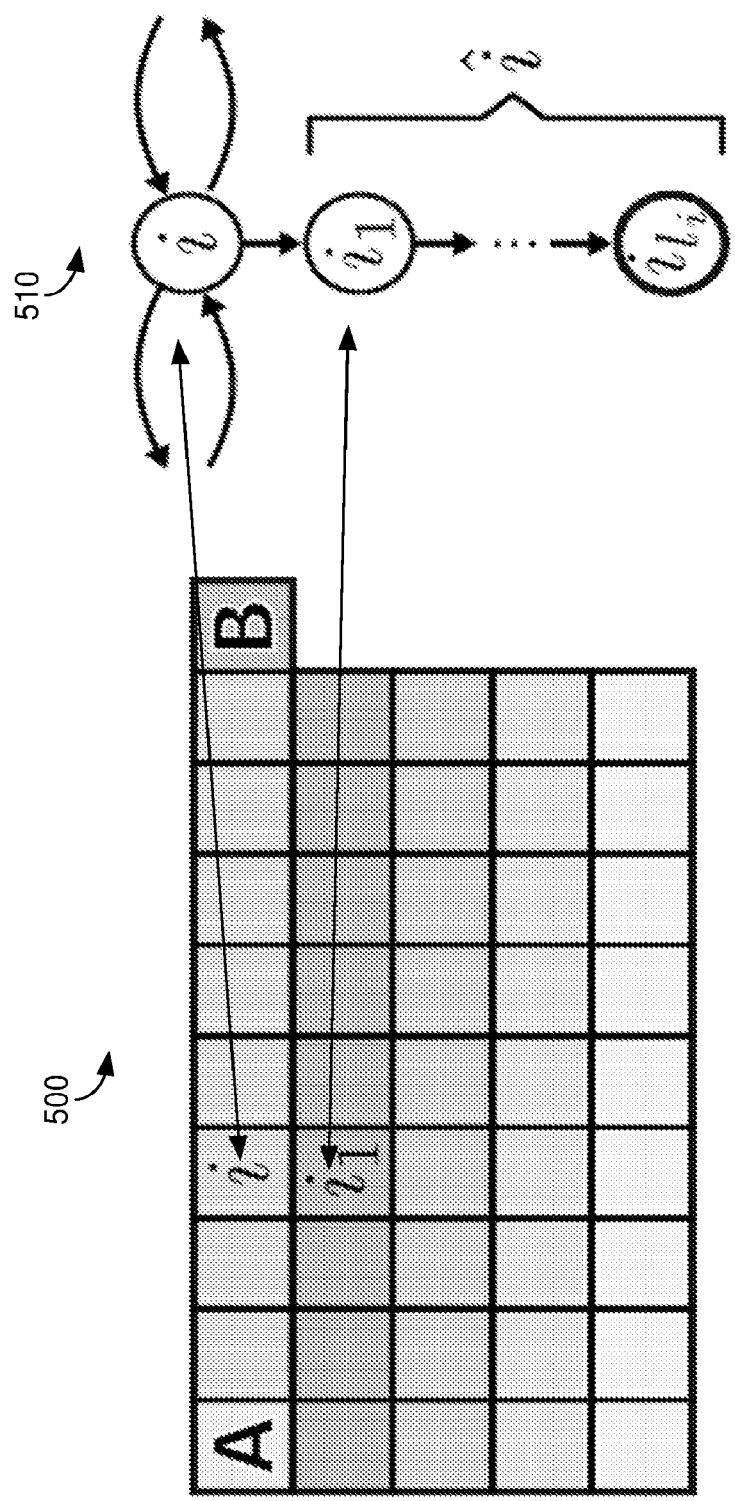
FIG. 5A shows a "bridge game" and corresponding MDP in accordance with an embodiment of the present disclosure.

FIG. 5A shows a "bridge game" and corresponding MDP in accordance with an embodiment of the present disclosure. In the bridge game, the agent initially starts at block A, and the goal of the agent is to traverse the environment to reach block B. The mist direct, horizontal path between A and B is modeled as a "bridge," and any step off the bridge results in a dead-end trajectory. That is, any state not included in the states in the topmost row of states is a dead-end state. That is, any step away from the bridge results in a dead-end trajectory with a random length $l_i$. The MDP 510 corresponding to the bridge game 500 is also shown in FIG. 5A. Bridge game 500 includes a bridge of length L=9, however, in other embodiments, L may be any positive integer.

FIG. 5B shows the convergence of training an agent to play the bridge game 500 of FIG. 5A, where the agent is trained via conventional RL methods. Thus, FIG. 5B shows the convergence of conventional RL methods. The length of the bridge game if varied as L=11, L=13, and L=15. Plot 520 shows the convergence for training the agent via conventional Q-learning via a conventional ε-greedy mechanism (ε=0.1). Curve 522 shows the ε-greedy results for L=11. Curve 524 shows the ε-greedy results for L=13. Curve 526 shows the ε-greedy results for L=15. Note the discontinuity in the horizontal scale of plot 520. This discontinuity demonstrates that conventional Q-learning via ε-greedy mechanisms, has significantly slower convergence for L=13, than for L=15. Note that training via conventional Q-learning may require millions of training episodes to converge on a reasonable policy.

Plot 530 shows the convergence for training the agent via conventional Q-learning via a conventional Boltzmann mechanism. Curve 532 shows the Boltzmann results for L=11. Curve 534 shows the Boltzmann results for L=13. Curve 536 shows the Boltzmann results for L=15. Note the discontinuity in the horizontal scale of plot 530. This discontinuity demonstrates that conventional Q-learning via Boltzmann mechanisms, has significantly slower convergence for L=13, than for L=15. Note that training via conventional Q-learning may require millions of training episodes to converge on a reasonable policy.

Plot 540 shows the convergence for training the agent via conventional Q-learning via a conventional count-based mechanism. Curve 542 shows the count-based results for L=11. Curve 544 shows the count-based results for L=13. Curve 546 shows the count-based results for L=15. Note the discontinuity in the horizontal scale of plot 540. This discontinuity demonstrates that conventional Q-learning via count-based mechanisms, has significantly slower convergence for L=13, than for L=15. Note that training via conventional Q-learning may require millions of training episodes to converge on a reasonable policy.

FIG. 5C shows the convergence of training an agent to play the bridge game 500 of FIG. 5A, where the agent is trained via the enhanced secure exploration RL methods discussed herein. Plot 550 shows the convergence for training the agent via the enhanced Q-learning methods discussed herein. The results shown in plot 550 were generated via the off-policy secure exploration training discussed herein. Curve 552 shows the convergence for training an agent via a secure exploration for L=11. Curve 554 shows the convergence for training an agent via a secure exploration for L=15. Curve 556 shows the convergence for training an agent via a secure exploration for L=20. Curve 58 shows the convergence for training an agent via a secure exploration for L=25. Notably, comparison of curve 554 to conventional curves 526, 536, and 546 demonstrates significantly faster convergence via the enhanced embodiments here. Also note that that for L=25, curve 558 demonstrates that the enhanced embodiments adequately converge in less than 3 k episodes. In contrast, conventional Q-learning may require tens of millions of training to converge.

Plot 560 shows the sensitivity of the convergence of the enhanced embodiments discussed herein, when using an ε-greedy mechanism to simultaneously train the exploration and exploitation agents. All results in plot 560 are for L=11. Curve 562 shows the convergence for training an agent with ε=1.0 (i.e., no exploitation and fully secure). Curve 564 shows the convergence for training an agent with ε=0.8. Curve 566 shows the convergence for training an agent with ε=0.6. Curve 568 shows the convergence for training an agent with ε=0.4. Curve 568 shows the convergence for training an agent with ε=0.2 (i.e., very little exploration). As shown via the trends of plot 560, the fast convergence occurs with no exploitation. In general, in applications that involve bridge effects, considerable improvement in convergence is achieved via securing the exploration, as discussed herein.

FIG. 6A provides a formal proof to Theorem 1, which is relied upon for securing the training of an exploration agent. FIG. 6B provides a formal proof to Theorem 2, which is relied upon for securing the training of an exploration agent. FIG. 6C provides a formal proof to an auxiliary result that may be relied upon for securing the training of an exploration agent.

Accordingly, various aspects of technology are described that provide secured exploration for reinforcement learning environments, which in turn provides significantly increased efficiency of computing resource usage and network bandwidth usage, as well as greatly attenuates safety and cost considerations associated with conventional reinforcement learning. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 7:
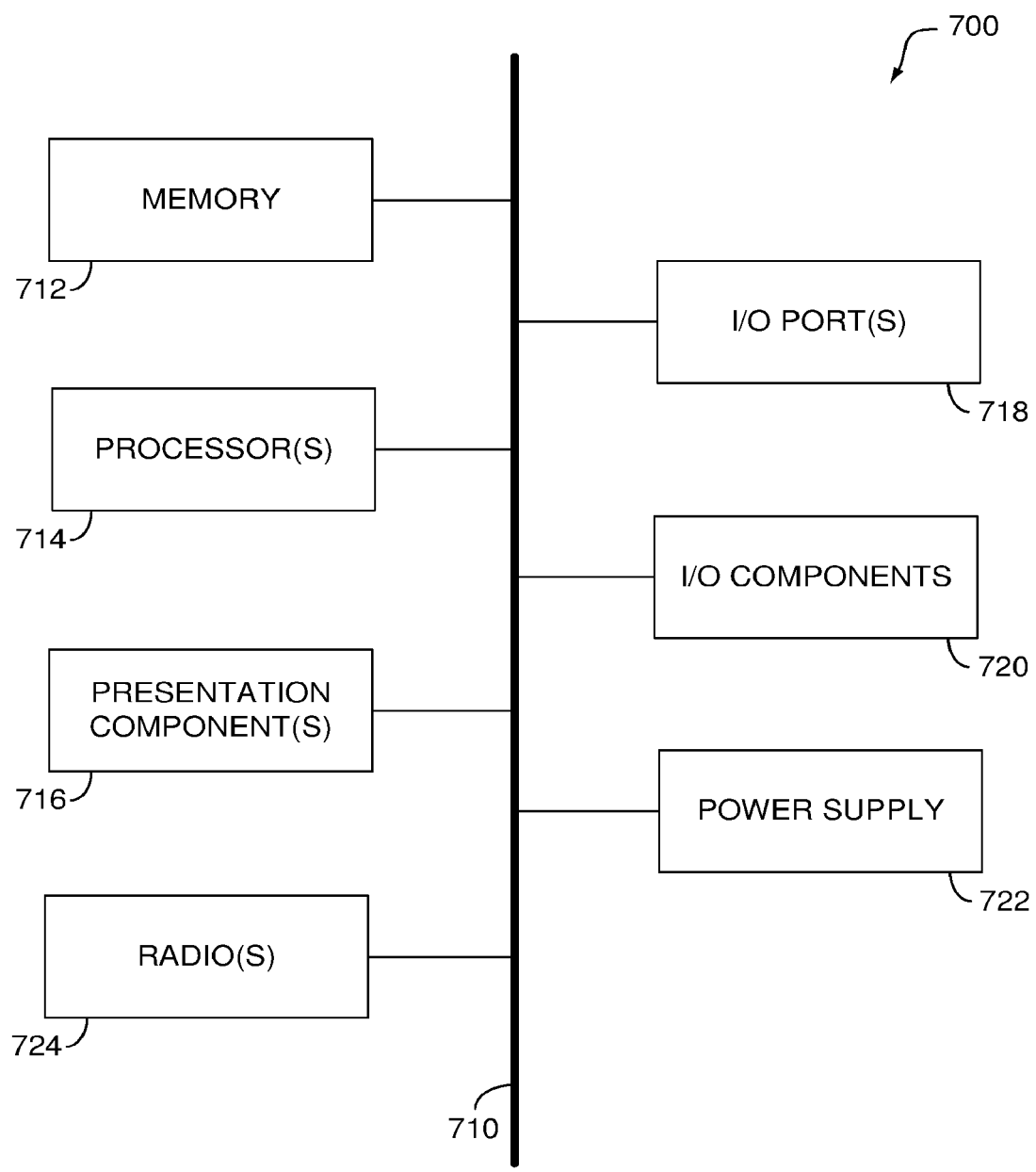
FIG. 7 is a block diagram of an exemplary computing environment suitable for use in implementing an embodiment of the present disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. In some implementations, presentation component 220 of system 200 may be embodied as a presentation component 716. Other examples of presentation components may include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When referring to "short" and "long" types of connections, the spatial relationship between two devices may or may not be indicative of the "shortness," or "longness" (e.g., length of range) of the types of connections. Instead, short range and long range connections may refer to different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer implemented method comprising:
   determining a current state of an agent within an environment of a decision process that models a performance of a task;
   determining a plurality of actions based on the decision process, wherein each of the plurality of actions is available for execution at the current state of the agent;
   employing a secured policy to select a first action of the plurality of actions, wherein the secured policy provides a score for each of the plurality of actions that is based on a probability that performing the action at the current state of the agent will transition the current state of the agent to a dead-end state of the agent, wherein each of a plurality of possible trajectories from the dead-end state terminates at an undesired terminal state of the agent; and
   executing the first action for the performance of the task.

2. The method of claim 1, wherein the performance of the task includes achieving an objective within a virtualized environment and executing the first action transitions the current state of the agent to a winning state the includes the agent achieving the objective within the virtualized environment.

3. The method of claim 1, wherein the performance of the task includes providing a therapeutic treatment in a physical environment and executing the first action includes providing a user one or more pharmaceuticals.

4. The method of claim 1, further comprising:
   iteratively exploring the environment of the decision process;
   iteratively determining an exploration action-value function based on iteratively exploring the environment of the decision process;
   iteratively updating a security cap based on the iteratively determined exploration action-value function and one or more probabilities that a particular state of the agent is the dead-end state; and
   iteratively updating the secured policy based on the iteratively updated security cap, wherein the updated secured policy does not exceed the security cap and is reduced by an amount that is based on the one or more probabilities that the particular state of the agent is the dead-end state.

5. The method of claim 1, wherein each undesired terminal state of a plurality of undesired terminal states of the agent are associated with an exploration reward value of −1.0 and each dead-end state of a plurality of dead-end states of the agent are associated with an exploration reward value that is between −1.0 and 0.0.

6. The method of claim 1, wherein the secured policy is iteratively updated based on an off-policy mechanism and the agent is an exploitation agent that is iteratively updated based on the iteratively updated secure policy.

7. A computer implemented method comprising:
   determining a current state of an agent within an environment of a decision process that models a performance of a task;
   determining a plurality of actions based on the decision process, wherein each of the plurality of actions is available for execution at the current state of the agent;
   employing a secured policy to select a first action of the plurality of actions, wherein the secured policy provides a score for each of the plurality of actions that is based on a probability that performing the action at the current state of the agent will transition the current state of the agent to a dead-end state of the agent, wherein the secured policy is determined through a reinforcement learning (RL) method that employs a security cap to reduce an amount of resources employed to explore a plurality of dead-end states of the agent, and wherein the security cap is based on an exploration decision process that has an exploration rewards function that is separate from a reward function of the decision process and an exploration discount factor that is separate from a discount factor of the decision process; and
   executing the first action for the performance of the task.

8. The method of claim 7, wherein the performance of the task includes achieving an objective within a virtualized environment and executing the first action transitions the current state of the agent to a winning state the includes the agent achieving the objective within the virtualized environment.

9. The method of claim 7, wherein the performance of the task includes providing a therapeutic treatment in a physical environment and executing the first action includes providing a user one or more pharmaceuticals.

10. The method of claim 7, further comprising:
    iteratively exploring the environment of the decision process;
    iteratively determining an exploration action-value function based on iteratively exploring the environment of the decision process;
    iteratively updating the security cap based on the iteratively determined exploration action-value function and one or more probabilities that a particular state of the agent is the dead-end state; and
    iteratively updating the secured policy based on the iteratively updated security cap, wherein the updated secured policy does not exceed the security cap and is reduced by an amount that is based on the one or more probabilities that the particular state of the agent is the dead-end state.

11. The method of claim 7, wherein each of a plurality of possible trajectories from the dead end-state terminates at an undesired terminal state of the agent.

12. The method of claim 7, wherein each undesired terminal state of a plurality of undesired terminal states of the agent are associated with an exploration reward value of −1.0 and each dead-end state of the plurality of dead-end states of the agent are associated with an exploration reward value that is between −1.0 and 0.0.

13. The method of claim 7, wherein the secured policy is iteratively updated based on an off-policy mechanism and the agent is an exploitation agent that is iteratively updated based on the iteratively updated secure policy.

14. A computer implemented method comprising:
determining a current state of an agent within an environment of a decision process that models a performance of a task;
determining a plurality of actions based on the decision process, wherein each of the plurality of actions is available for execution at the current state of the agent;
employing a secured policy to select a first action of the plurality of actions, wherein the secured policy provides a score for each of the plurality of actions that is based on a probability that performing the action at the current state of the agent will transition the current state of the agent to a dead-end state of the agent, wherein the secured policy is determined through a reinforcement learning (RL) method that employs a security cap to reduce an amount of resources employed to explore a plurality of dead-end states of the agent; and
executing the first action for the performance of the task.

15. The method of claim 14, wherein the performance of the task includes achieving an objective within a virtualized environment and executing the first action transitions the current state of the agent to a winning state the includes the agent achieving the objective within the virtualized environment.

16. The method of claim 14, wherein the performance of the task includes providing a therapeutic treatment in a physical environment and executing the first action includes providing a user one or more pharmaceuticals.

17. The method of claim 14, further comprising:
iteratively exploring the environment of the decision process;
iteratively determining an exploration action-value function based on iteratively exploring the environment of the decision process;
iteratively updating the security cap based on the iteratively determined exploration action-value function and one or more probabilities that a particular state of the agent is the dead-end state; and
iteratively updating the secured policy based on the iteratively updated security cap, wherein the updated secured policy does not exceed the security cap and is reduced by an amount that is based on the one or more probabilities that the particular state of the agent is the dead-end state.

18. The method of claim 14, wherein each of a plurality of possible trajectories from the dead end-state terminates at an undesired terminal state of the agent.

19. The method of claim 14, wherein each undesired terminal state of a plurality of undesired terminal states of the agent are associated with an exploration reward value of −1.0 and each dead-end state of the plurality of dead-end states of the agent are associated with an exploration reward value that is between −1.0 and 0.0.

20. The method of claim 14, wherein the secured policy is iteratively updated based on an off-policy mechanism and the agent is an exploitation agent that is iteratively updated based on the iteratively updated secure policy.

\* \* \* \* \*